Dec. 13, 1966      R. B. MATTHEWS      3,290,937
APPARATUS FOR MEASURING THE MASS FLOW OF FLUIDS
Filed May 25, 1964      2 Sheets-Sheet 1

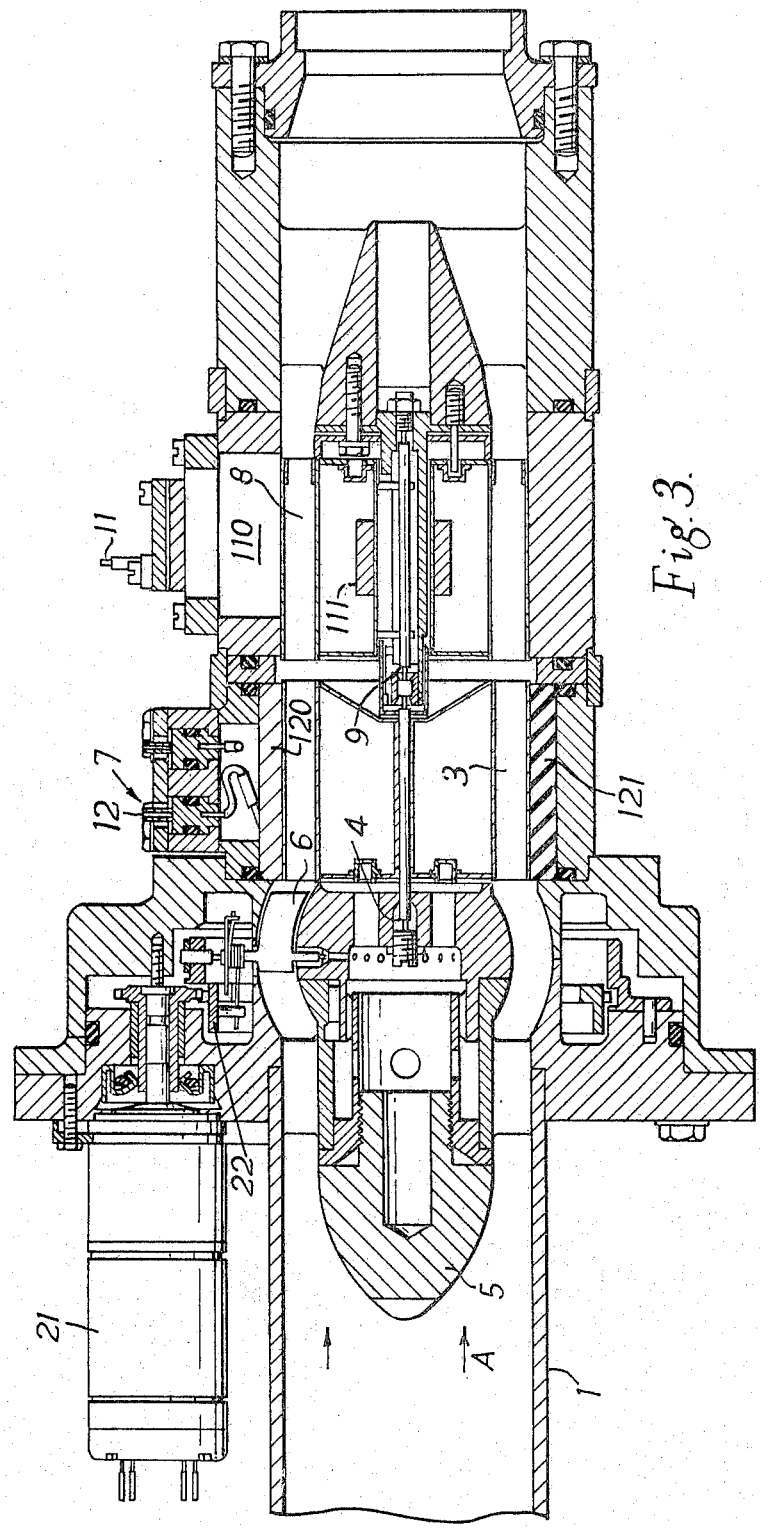

United States Patent Office 3,290,937
Patented Dec. 13, 1966

3,290,937
APPARATUS FOR MEASURING THE MASS FLOW OF FLUIDS
Robert Barry Matthews, Eastleigh, England, assignor to Plessey-UK Limited, Ilford, England, a British company
Filed May 25, 1964, Ser. No. 371,873
Claims priority, application Great Britain, May 29, 1963, 21,522/63
2 Claims. (Cl. 73—231)

This invention relates to the measurement of fluid flow and has for an object to provide an improved measuring instrument by which the momentary mass flow of fluid in a duct can be ascertained. Co-pending United States patent application No. 255,717, now U.S. Patent No. 3,241,367, which has been assigned to the assignees of the present application, describes a mass-flow measuring device which comprises a combination of stationary deflector means arranged in a duct to impart to the fluid a swirl about the axis of the duct, means for determining the rate of swirl thus produced, and torque-responsive reactor means for determining a torque reaction produced by this swirling movement of the fluid through the duct. This torque reaction is under any given conditions proportional to the mass flow of fluid passing through the duct and to the rate of swirl, and since the torque and the rate of swirl are determined respectively by the two means indicated, the mass flow can be ascertained as the quotient of the two data obtained. The said co-pending application also describes the inclusion of computer means for automatically ascertaining the quotient which is proportional to the mass flow and the inclusion of means for automatically so varying the angles of the deflector blades producing the swirl as to reduce the range of rotor speeds required to cover a given range of mass flow, and it is a more specific object of the present invention to provide improved means for controlling the automatic adjustment of the deflector setting. According to the present invention a servomotor effecting the adjustment of the deflector setting is controlled by the output of the computer means determining the mass flow so that the deflector blades are set at an angle which is directly determined by the mass flow passing through the duct. Further computer means may be interposed to arrange for the setting to vary according to any desired function of the mass flow. A particularly accurate regulation of the deflector setting can be obtained by the use of a digital computer.

Figure 1:
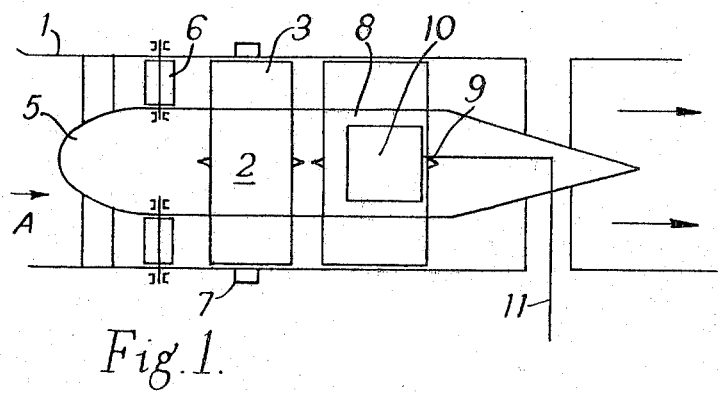
Figure 2:
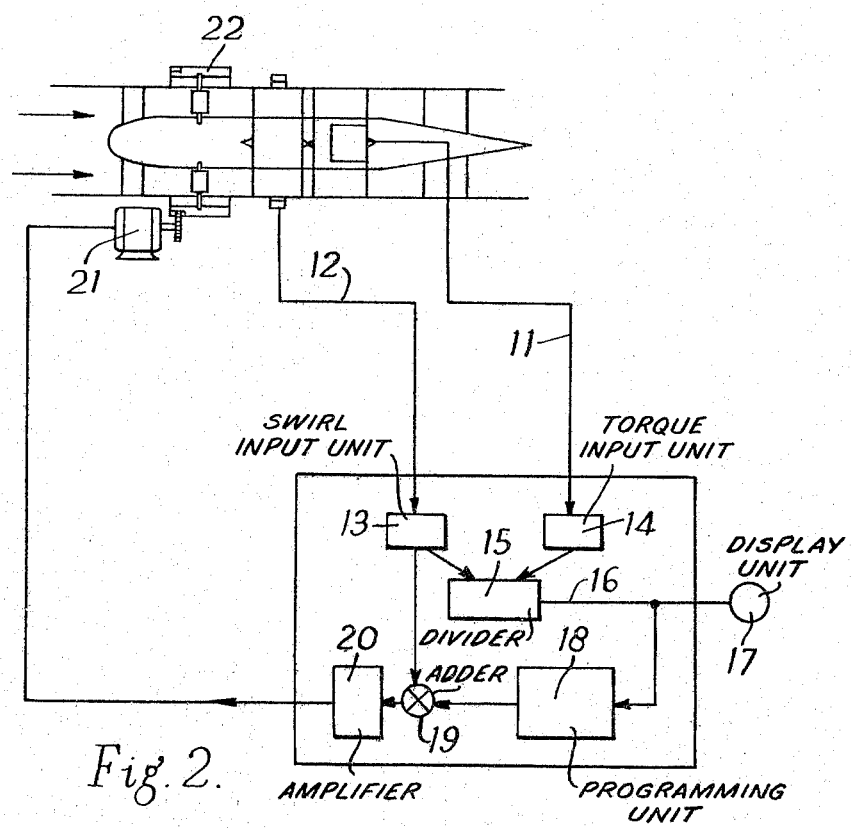

In the accompanying drawing,

FIGURE 1 is a diagrammatic axial section through a duct portion fitted with the transmitter of a mass-flow meter, to which the present invention is to be applied, FIGURE 2 shows a mass-flow meter according to the present invention and including a somewhat modified transmitter, the electrical part being shown in the form of a block diagram, and FIGURE 3 is a sectional elevation of a practical form of the transmitter of FIGURE 2.

Referring now first to FIGURE 1 a a duct 1 through which a mass-flow of fluid passes in the direction of the arrows A, contains a turbine wheel or speed paddle 2, which is fitted with blades 3 and mounted for free rotation between centres 4 in a fairing body 5. Upstream of the turbine blades 3 is a set of guide vanes 6 constituting deflector elements. The angle of these vanes relative to the axial direction is variable so that a reasonably high rate of swirl, ensuring reliable response of the speed paddle 2, can be produced when the flow rate is low without having to cause the speed paddle 2 to rotate at an excessive speed at high rates of flow. A device 7 producing pulses at a rate proportional to the speed of the paddle 2 is provided on the duct wall, and a second paddle 8, likewise mounted in the fairing body 5 between centres, indicated at 9, is provided with electrostatic torque-sensitive restraining means 10, which are arranged to produce at 11 an electrical output representing the torque.

Referring now to FIGURE 2, an electrical output corresponding to the pulse count and representing the speed of rotation of the speed paddle 2 is fed through a line 12 to a computer-input unit 13, which produces a digital output representing the speed of swirl, while the output from line 11, which represents the torque reaction on torque paddle 8, is similarly fed to a second computer-input unit 14 whose output represents the digital value of the torque. The outputs of the two units 13 and 14 are fed to a divider unit 15, and the electrical output of this divider unit, appearing at 16, is fed to a display, recording, and/or control unit 17, where it appears as the output of the mass-flow meter. In addition the output of the divider unit 15 is also fed to a programming unit 18, which serves to determine from the mass-flow output the speed $N_I$ at which, according to a desired function, the paddle wheel is intended to run for the mass flow ascertained. The thus determined value $N_I$ is fed as a positive input to an algebraic adder 19, to which the actual speed N of the paddle wheel ascertained by computer-input device 13 is also fed as a second, negative input. The algebraic sum of the two inputs constitutes the speed error, and a signal of corresponding polarity is, after amplification by a servo-amplifier 20, fed to an electric motor 21. This motor drives a rotatable ring 22 that controls the setting of the guide vanes; the direction in which the motor 21 is driven is so chosen as to reduce the speed error by reducing the setting angle of the blades when the speed N of the paddle 2 is higher, and by increasing the setting angle when the speed of the paddle 2 is lower than the value $N_I$ supplied by the programming device 18.

The transmitter of the mass-flow meter of FIGURE 2 and the duct section containing it is shown in more detail in FIGURE 3, in which the same reference characters as in FIGURES 1 and 2 are used to indicate corresponding items.

As will be seen from FIGURE 3, the line 12 for the speed count is applied to a stationary capacitor electrode 120 embedded in insulating material 121 so that at each passage of one of the vanes 3 its capacitance to the earthed rotor increases, this increase being employed to produce a counting pulse in a manner well known to those skilled in the art.

For this purpose the torque paddle is restrained against rotation by incorporating in the stator a permanent magnet 110 producing a field that extends diametrically across the torque paddle, while the latter incorporates a diametrically extending magnetic armature which tends to align itself with the field and therefore, for small deflections from the neutral position, produces a torque in proportion to the deflection. This permits the torque signal in line 11 to be produced in a somewhat similar manner to the speed signal by the provision of a capacitor electrode in the torque paddle, which co-operates with two stationary electrodes in such manner as to form two capacitors which under no-torque conditions are equal but are changed in opposite directions as the paddle is deflected from its no-torque position. A capacity-measuring bridge incorporating the two capacitors can therefore be employed to produce an output proportional to the angular displacement and thus to the torque reaction of the paddle.

It will be readily appreciated that details of the embodiment described with reference to the drawing may be varied without exceeding the scope of the invention.

Thus the vane-angle setting device may be of a different construction and may, for example, be operated hydraulically instead of electrically if desired, and all or some of the computer elements employed may be of the analogue type instead of the digital type.

What I claim is:

1. A mass-flow metering device comprising: stationary deflector means arranged in a duct to impart to fluid flowing along the duct a swirl about the axis of the duct, said deflector means including vanes which are adjustable as to their angle of attack with respect to the axial direction of the duct; rate-sensor means producing a digital output corresponding to the rate of swirl thus produced; torque-sensor means determining a torque reaction produced by the thus produced swirl of the fluid flowing through the duct and producing a digital output corresponding to the said torque reaction; digital computer means producing a digital output, means feeding to said computer means the respective digital outputs of the rate-sensor means and of the torque-sensor means, the computer means being constructed to determine the mass flow as the quotient of said digital outputs; a servomotor operatively connected to the deflector means to vary the angle of attack of the deflector vanes with respect to the axial direction of the duct; and control means for this servomotor, the said servomotor-control means including an algebraic adder to which the digital outputs of the computer means and of the rate sensor are differentially fed, and means sensitive to the sign of the adder output and operative to select the direction of operation of the servomotor.

2. A mass-flow metering device as claimed in claim 1, wherein the servo-motor-control means further include a programming unit through which the digital output of the computer means is fed to the digital adder, and which produces a digital output that is a non-linear function of the mass flow.

References Cited by the Examiner

UNITED STATES PATENTS

| | | | |
|---|---|---|---|
| 3,063,295 | 11/1962 | Dowdell | 73—194 |
| 3,164,017 | 1/1965 | Karlby et al. | 73—194 |

RICHARD C. QUEISSER, *Primary Examiner.*

JAMES J. GILL, *Examiner.*

EDWARD D. GILHOOLY, *Assistant Examiner.*